United States Patent [19]

Giasson et al.

[11] Patent Number: 5,479,786
[45] Date of Patent: Jan. 2, 1996

[54] FLOW REGULATING VALVE APPARATUS FOR AIR CONDITIONING SYSTEMS

[75] Inventors: Eric J. Giasson, Somerset, Mass.; Joseph M. Gondusky, Warwick, R.I.; Kevin J. Laboe, Birmingham, Mich.

[73] Assignee: Texas Instruments Incorporated, Dallas, Tex.

[21] Appl. No.: 219,070

[22] Filed: Mar. 29, 1994

[51] Int. Cl.$^6$ .................................................. G05D 23/08
[52] U.S. Cl. ...................... 62/222; 230/93 R; 230/101 D
[58] Field of Search .......................... 236/93 R, 101 D, 236/93 B, 101 E; 62/222

[56] References Cited

U.S. PATENT DOCUMENTS

| | | | |
|---|---|---|---|
| 2,063,621 | 12/1936 | Peteler | 236/101 D X |
| 3,294,148 | 12/1966 | Alvarado | 236/93 R X |
| 4,180,208 | 12/1979 | Obermaier | 236/93 B |
| 4,502,627 | 3/1985 | Ty | 236/101 E X |
| 4,527,733 | 7/1985 | Anderson | 236/93 R X |
| 4,783,000 | 11/1988 | Ty | 236/93 R |
| 4,951,478 | 8/1990 | McDonald | 62/222 |
| 5,025,640 | 6/1991 | Drucker | 62/222 X |
| 5,029,454 | 7/1991 | Eisberg | 62/222 X |
| 5,259,554 | 11/1993 | Ewing et al. | 236/93 B X |

*Primary Examiner*—William E. Tapolcai
*Attorney, Agent, or Firm*—Russell E. Baumann; Richard L. Donaldson; René E. Grossman

[57] ABSTRACT

A flow regulating valve for air conditioning systems is shown in which a body member (26, 26a–26e) is provided with a passageway (28, 28a–28f) which results in regulating flow of refrigerant into the evaporator of the air conditioning system under normal conditions. Under severe operating conditions, e.g., high ambient temperature and low or idle speeds, the system refrigerant pressure rises. This increases pressure in the evaporator and an increase in the saturation temperature of refrigerant in the evaporator. This increase in temperature is sensed by a thermostatic metal element (44, 80, 88) of the regulating valve which moves to increase restriction to the flow of the refrigerant fluid through the valve thereby decreasing pressure of the refrigerant entering the evaporator. In several embodiments the thermostatic metal element is in the form of a helix (44) with one end fixed to the body member and the opposite end attached to a sleeve (38, 38d) in certain embodiments and an end cap (54, 60, 68) in other embodiments to rotate the sleeve or end cap to restrict fluid flow in an auxiliary passage. In other embodiments the thermostatic metal element is a relatively straight strip (80, 88) having one end fixed to the body member and its opposite end, in one embodiment, movable toward and away from an auxiliary inlet port (34) and in another embodiment the opposite end is attached to a block (94) having a relatively smaller effective passage (29e) movable into and out of alignment with a larger passage (31e) to change the effective level of flow restriction.

15 Claims, 3 Drawing Sheets

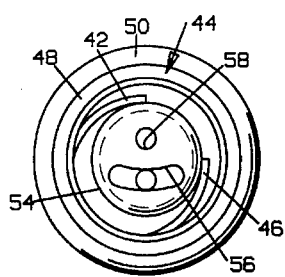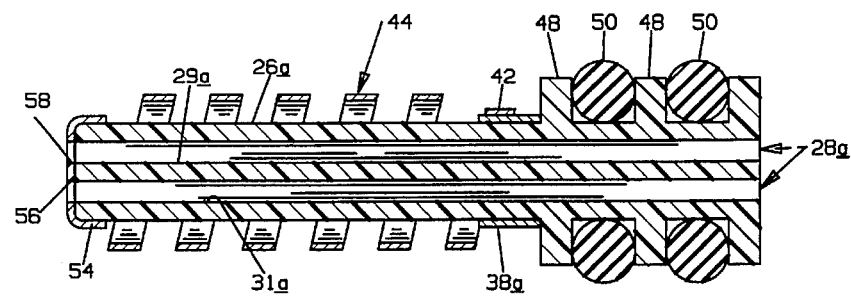
FIG. 5    FIG. 4
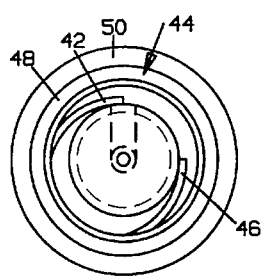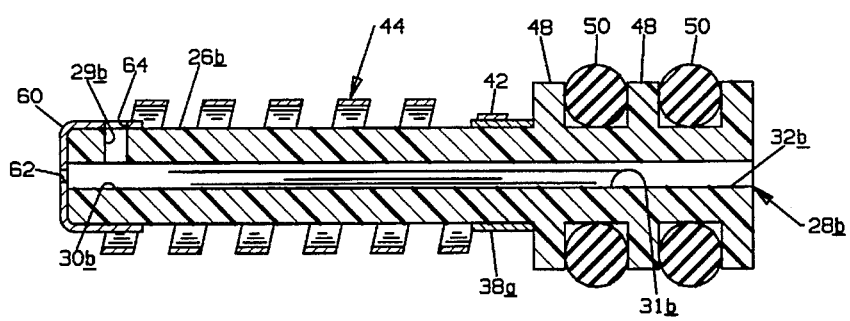
FIG. 7    FIG. 6
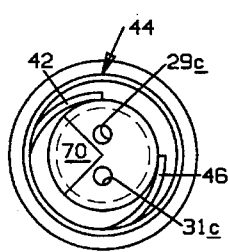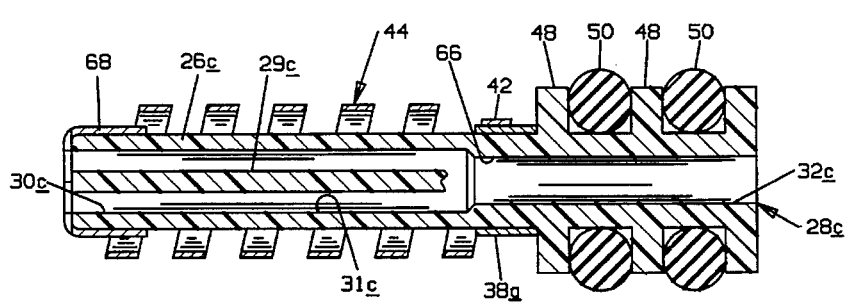
FIG. 9    FIG. 8

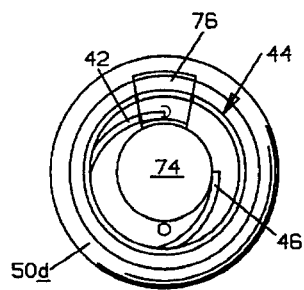 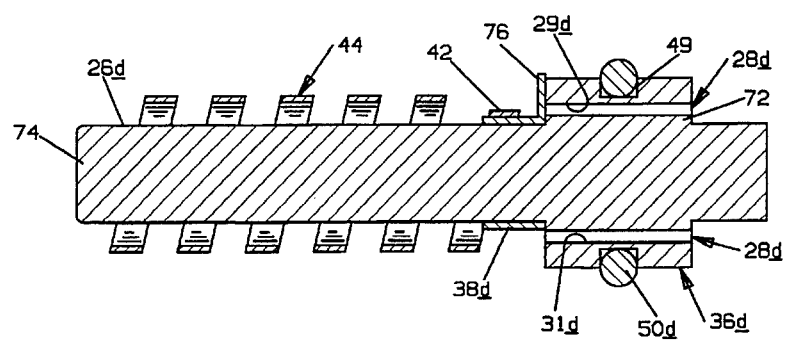
FIG. 11  FIG. 10
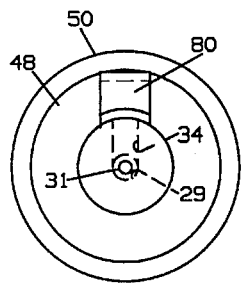 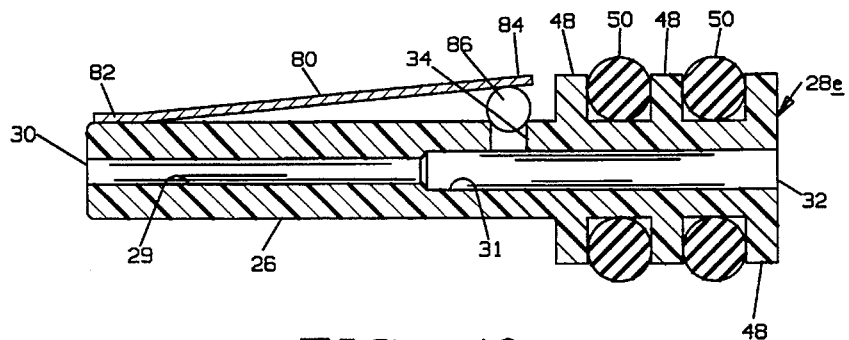
FIG. 13  FIG. 12
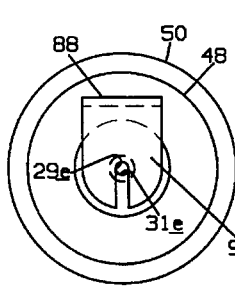 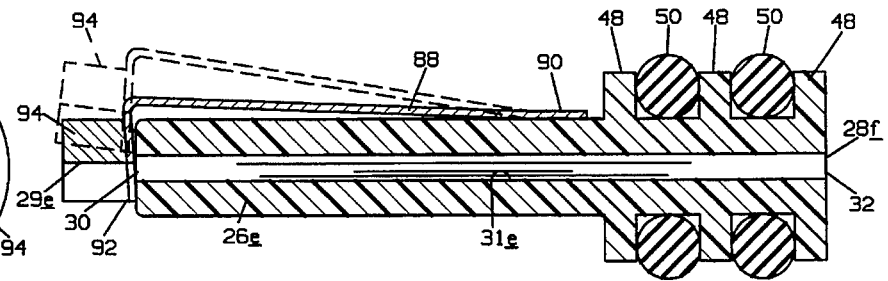
FIG. 15  FIG. 14

FLOW REGULATING VALVE APPARATUS FOR AIR CONDITIONING SYSTEMS

BACKGROUND OF THE INVENTION

1. Field of the Invention

This invention relates generally to air conditioning systems and more particularly to a control valve for refrigerant entering an evaporator of an automotive air conditioning system.

It is conventional in automotive air conditioning systems to use a control valve to regulate the flow of refrigerant into the evaporator. The control valve throttles flow of the refrigerant liquid passing from the condenser into the evaporator to thereby reduce the pressure of the refrigerant entering the evaporator and provide efficient operation of the system.

One type of control valve currently in use is an expansion valve which senses evaporator pressure and temperature and regulates refrigerant flow by moving a pin along its longitudinal axis to displace a valve element from a valve seat disposed in the flow stream against the bias of a spring. The position of the valve element determines the degree which the refrigerant liquid passing from the condenser into the evaporator is throttled. Such valves are effective in maintaining reasonably optimum system performance under varying operating conditions; however, they are relatively expensive and complex mechanisms which are subject to malfunction requiring costly replacement expenses. Another disadvantage of such valves relates to the difficulty in providing sufficient space to fit the relatively large package in many engine compartments.

Another common valve currently in use, known as an orifice tube, comprises a short tube having a relatively small diameter bore which throttles flow of the refrigerant liquid. Although the ideal size of the orifice varies with the particular operating conditions of the system; a compromise is made in which the diameter of the tube is generally selected so that under conditions which include road speeds and relatively low temperature air the orifice throttles flow to provide efficient operation of the system. However, at idle speeds and high ambient temperature conditions system refrigerant pressure rises causing a concomitant increase in evaporator pressure. This results in increasing the refrigerant's saturation temperature and decreasing the cooling efficiency of the system. Under such conditions, a smaller diameter orifice would restrict flow to a greater extent and thereby lower evaporator pressure and improve the cooling efficiency of the system.

Attempts have been made using a tube having an orifice diameter selected to provide suitable flow at normal road speed conditions along with means to change the effective size of the orifice to restrict flow and decrease pressure downstream of the control valve at operating conditions which increase the condenser pressure, such as high ambient temperature, idle speed conditions. An example of a device incorporating such flow restricting means is shown in U.S. Pat. No. 4,951,478 in which an orifice tube is supported in a piston movably mounted in a cylinder. The orifice and piston in one position functions in the same manner as a conventional fixed orifice control; however increased pressure causes the piston to move against the bias of a spring to a second position adjacent a solid plug axially aligned with the exit end of the orifice tube to restrict flow through the tube. While this type of device could be effective in providing restricted flow when condenser pressure increases, the components are very small making it relatively costly to manufacture and assemble.

SUMMARY OF THE INVENTION

It is an object of the present invention to provide a simple, reliable and relatively inexpensive device which will regulate refrigerant flow into an evaporator to obtain desired operating efficiency of an air conditioning system. Another object is the provision of a control device for regulating refrigerant flow which can be easily manufactured and assembled and one which has a long useful life. Other objects and features of the invention will be in part apparent and in part pointed out hereinafter.

Briefly, a control device made in accordance with the invention, comprises a member receivable in a conduit of an air conditioning system having means to provide a seal between the member and the conduit. A passageway having an inlet and an outlet extends from an inlet side of the seal means to an outlet side of the seal means and a temperature responsive thermostatic metal element has one end fixedly mounted relative to the member and an opposite end movable to open and close at least a portion of the inlet of the passageway in dependence upon the temperature of the thermostatic metal element. In certain preferred embodiments of the invention the thermostatic metal element is formed into a helix with the movable end coupled to an end cap or a sleeve rotatably mounted on the member and adapted to rotate in dependence upon the temperature of the thermostatic metal element between a position in which flow is restricted to a selected degree through an inlet of the passageway and another position in which flow through the passageway is further restricted. In certain other embodiments the thermostatic metal element is a generally straight strip of material with the movable end movable in a direction toward and away from the longitudinal axis of the member. The passageway, in certain embodiments comprises two separate passages with the flow of only one passage subjected to the additional flow restriction. In other embodiments, the passageway has first and second inlet portions which merge into an enlarged outlet passage with one inlet portion subjected to the additional flow restriction.

BRIEF DESCRIPTION OF THE DRAWINGS

FIGS. 4, 6, 8, 10, 12 and 14 are views, similar to FIG. 2. of alternate embodiments of the invention with the valves shown in cross section and not showing the conduit; and FIGS. 5, 7, 9, 11, 13 and 15 are end views of FIGS. 4, 6, 8, 10, 12 and 14 respectively.

DETAILED DESCRIPTION OF THE PREFERRED EMBODIMENTS

Figure 1:
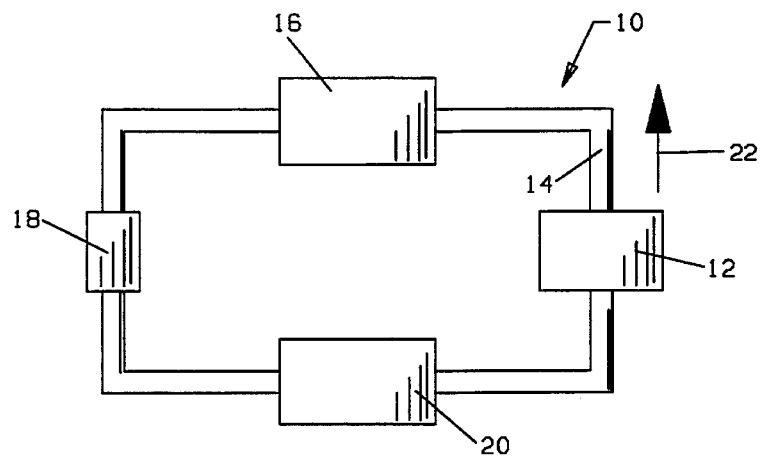
FIG. 1 is a diagrammatic view of an air conditioning system which includes a flow regulating valve.

As shown in FIG. 1, an air conditioning system 10 comprises a compressor 12 coupled through conduit 14 to condenser 16, then through a flow regulating valve 18 to evaporator 20 and then back to compressor 12. Arrow 22 shows the direction of flow of the refrigerant. In the case of automotive air conditioning systems, as mentioned above, flow regulating valve 18 can take the form of a simple tube having a selected orifice to reduce the pressure of the refrigerant leaving the condenser prior to its entry into the evaporator.

Figure 2:
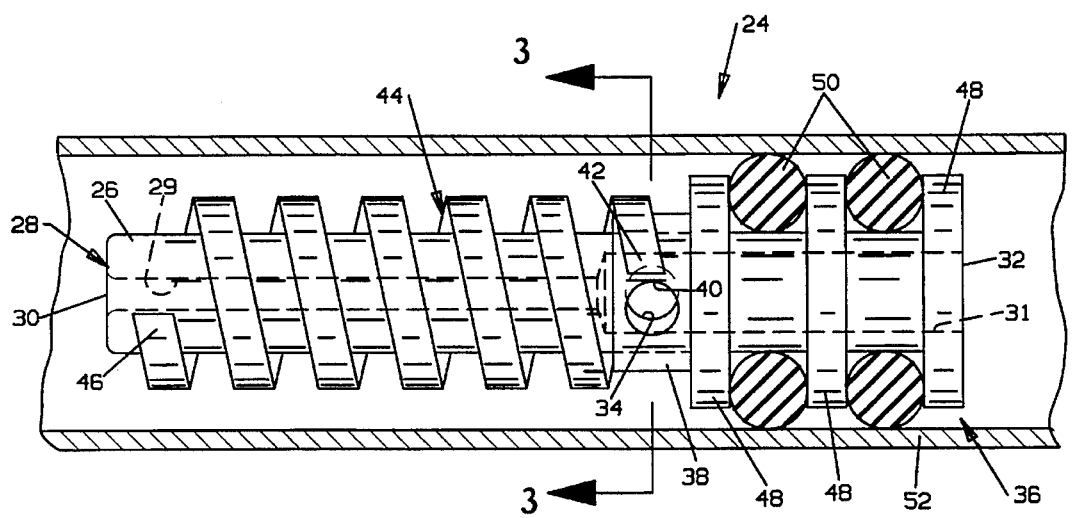
FIG. 2 is a front elevational view of a flow regulating valve made in accordance with a first embodiment of the invention, the valve received in a conduit shown in cross section.
Figure 3:
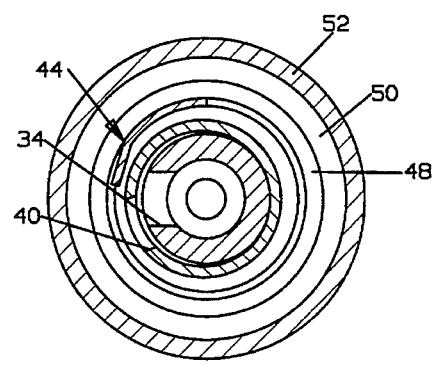
FIG. 3 is a cross sectional view taken on lines 3—3 of FIG. 2.

In accordance with the invention, an orifice tube is provided in which the effective size of the orifice is changed as the operating conditions are changed in order to increase the efficiency of the system. With particular reference to FIGS. 2 and 3, a flow regulating valve made in accordance with a first embodiment of the invention is shown. Valve 24 comprises an elongated body member 26 formed of a suitable metal material such as brass, steel or stainless steel or a polymer such as polyetherether ketone, nylon or polytetrafluorethylene having a passageway 28 extending from a first inlet port 30 at one end of member 26 to an outlet port 32 at the opposite end of member 26. Passageway 28 is formed with a first portion having relatively small diameter bore 29 in communication with a second portion 31 having a relatively large diameter bore. An auxiliary inlet port 34 extends through the sidewall of member 26 upstream of seal means 36 to be discussed below into communication with second portion 31 of passageway 28.

A sleeve 38, formed of suitable material, such as any of the materials referenced above for body 26, having an aperture 40 formed through the wall of the sleeve, is rotatably mounted on member 26 and is fixedly attached, as by welding, staking or forming a snap-on assembly, to an end 42 of a thermostatic metal element 44 formed into a helix configuration through which member 26 extends. The opposite end 46 of thermostatic metal element 44 is fixedly attached to body member 26 adjacent its inlet end in any suitable manner, as by welding if the material chosen for member 26 is weldable or by attaching it to a separate sleeve clamped to member 26, for example, if member 26 is formed of a polymer. Preferably, the materials are chosen to minimize friction between member 26 and rotatable sleeve 38.

Seal means 36 comprises annular flanges 48 extending radially from body member 26 to form seats for conventional seal elements such as flexible O-rings 50 to provide a seal between member 26 and a conduit 52 through which the circulating refrigerant flows.

When the air conditioning system is subjected to operating conditions associated with normal road speeds a selected first degree of flow restriction or throttling of the refrigerant fluid through the control valve is provided by inlet ports 30 and 34 with aperture 40 of sleeve 38 aligned with inlet port 34. This provides a sufficient lowering of the pressure of the refrigerant before it enters the evaporator 20 to result in efficient operation of the air conditioning system. As operating conditions become more demanding, for example, at idle speeds and at high ambient temperatures, the condenser pressure rises. This causes an increase in the refrigerant's saturation temperature which is transmitted to the thermostatic metal element 44 which causes it to rotate sleeve 38 moving aperture 40 out of alignment with inlet port 34 to further restrict flow of the refrigerant and decrease the pressure of the refrigerant in the evaporator thereby improving the cooling efficiency of the system. Although a single auxiliary inlet port 34 is shown in FIGS. 2 and 3, it is within the purview of the invention to provide one or more additional inlet ports in the sidewall of member 36 with matching apertures in sleeve 38 adapted to move into and out of alignment with respective auxiliary inlet ports as the sleeve is rotated under the influence of the temperature of thermostatic metal element 44. By way of example, a valve 24 made in accordance with FIGS. 2 and 3 had a passage 29 in the form of a circular bore approximately 0.047 inches in diameter and a passage 31 also in the form of a circular bore of approximately 0.089 inches in diameter.

A second embodiment of the control valve is shown in FIGS. 4 and 5. FIG. 4 shows a cross section taken along the longitudinal axis of member 26a which can be formed of any suitable material as in the case of member 26 of FIGS. 2 and 3; however, as shown in FIG. 4 member 26a is formed of a polymeric material, preferably one having a low coefficient of friction material such as polytetrafluorethylene. Thermostatic metal element 44 has end 42 fixedly attached to sleeve 38a which in turn is fixedly attached to member 26a in any suitable manner as by providing opposed flat surfaces on the periphery of member 26a and forming sleeve 38a with a corresponding configuration. Movable end 46 of thermostatic element 44 is fixedly attached to an end cap 54 which is rotatably mounted on the inlet end of member 26a. End cap 54 is formed with an arcuately shaped slot 56 which is aligned with passage 31a of passageway 28a. Passageway 31a extends the full longitudinal length of member 26a from the inlet end to an opposite outlet end. A second opening, bore 58, is formed in end cap 54 which is movable into and out of alignment with passage 29a of passageway 28a also extending the full longitudinal length of member 26a. Due to the arcuate shape of slot 56, passage 31a is open for the entire range of rotational movement of end cap 54 for the temperatures of concern. Under operating conditions calling for the lesser degree of flow restriction, bore 58 is aligned with passage 29a so that refrigerant flows through both passages 29a and 31a of passageway 28a but when there is an increase in condenser pressure which results in an increase in temperature of the refrigerant liquid the helical thermostatic element rotates to an angular orientation where passage 29a is fully or partially blocked but leaving passage 31a open. As a result the flow through passageway 28a is further restricted and the pressure of the refrigerant leaving the control valve is reduced.

A valve made in accordance with FIGS. 4 and 5 had passages 29a and 31a both formed of circular bores each having a diameter of approximately 0.047 inches.

The embodiment shown in FIGS. 6 and 7 includes an elongated body member 26b of any suitable material in which passageway 28b comprises relatively large diameter bore or passage 31b which extends the full longitudinal length of member 26b from inlet port 30b to outlet port 32b. A radially extending bore 29b is formed through the wall of member 26b in communication with bore 31b to serve as an auxiliary passage. A combination end cap and sleeve member 60 has a first centrally located bore 62 aligned with passage 31b so that it is always open. The diameter of bore 62 is preferably selected to be less than that of passage 31b. A second bore 64 is formed in the sidewall of member 60 and is adapted to rotate into and out of alignment with passage 29b in response to movement of thermostatic metal element 44 which has movable end 46 fixedly attached to member 60 and its opposite end 42 anchored to fixed sleeve 38a. Member 60, in the position shown in the figures provides a first degree of flow restriction and upon rotation due to an increase in the temperature of thermostatic element 44 will provide further flow restriction when bore 64 moves out of alignment with passage 29b.

The embodiment of FIGS. 8 and 9 comprises an elongated member 26c in which passageway 28c comprises first and second passages 29c and 31c extending from inlet port 30c to a merged passageway at 66 which continues along the longitudinal axis to outlet port 32c. Thermostatic metal element 44, as in the FIGS. 4 and 6 embodiments, has an end 42 anchored to a fixed sleeve 38a and an opposite end fixedly attached to a rotatable end cap 68. Cap 68 is provided with a flag portion 70 (FIG. 9) which slides over the inlet portion of passage 29c when the temperature of the helical thermostatic element is elevated. As in the above embodiments passage 31c remains open.

It is also within the purview of the invention to use the merged passageway of the FIG. 8 embodiment with an end cap similar to end cap 54 of the FIGS. 4, 5 embodiment or with a radially extending port from one of the FIG. 8, 9 embodiment passageways along with a rotatable sleeve having an aperture in its sidewall adapted to move into and out of engagement with the radially extending port.

The body member 26d shown in FIGS. 10 and 11 is provided with passageway 28d comprising passages 29d and 31d extending longitudinally through a hub portion 72 extending radially from member 26d. Thermostatic metal element 44 has a movable end 42 fixedly attached to sleeve 38d which is rotatably mounted on body member 26d. The opposite end of thermostatic element is fixed to end 74 of body member 26d in any suitable manner, as by welding thereto when member 26d is composed of weldable material. Sleeve 38d has a flag 76 extending radially therefrom which is adapted to slide across the inlet end of passage 29d in response to movement by the helical thermostatic element 44 upon having its temperature elevated to provide further flow restriction. As in the other embodiments described above, passage 31d remains open. It will be appreciated that, if desired, passageway 31d could be formed in the elongated portion of the body member 26d as well as in the hub portion. A modified seal means 36d comprises a suitable O-ring elastomeric seal member 50d received in a sealed seat 49 formed in the outer periphery of hub 72.

The above described embodiments employ a helical thermostatic metal element 44; however, an elongated, relatively straight strip of thermostatic metal can also be used to provide a variable orifice control device made in accordance with the invention. As shown in FIGS. 12 and 13, body member 26 corresponds to that shown in FIGS. 2 and 3 having a passage 29 extending from inlet port 30 along a portion of its longitudinal length to an enlarged diameter passage 31 which continues to outlet port 32. Auxiliary inlet port 34 radially extending through the wall of member 26 communicates with the enlarged diameter passage 31. An elongated, relatively straight strip of thermostatic metal 80 has an end 82 fixed to body member 26 adjacent the inlet port 30 by any suitable manner, as by welding, and an opposite end 84 adapted to move toward and away from auxiliary inlet port 34. If desired, a suitable closure element such as a conical element or the spherical element 86 shown in FIG. 12 is suitably mounted on the free distal end 84 of the thermostatic element to effectively seal auxiliary inlet port 34, formed as a circular bore when using a conical or spherical closure element. When the temperature of the refrigerant fluid contacting thermostatic element 80 increases sufficiently to elevate the temperature of element 80, end 84 will move toward auxiliary inlet 34 to restrict fluid flow and thereby decrease the pressure of the fluid downstream of the control device.

In the embodiment of FIGS. 14 and 15, a relatively straight, elongated strip 88 is fixed at one end 90 to body member 26e and has its opposite, free end bent approximately 90° to extend downwardly, as seen in FIG. 14, toward the body member to form a leg 92. A block 94 having a passage 29e in the form of a slot extending downwardly to the periphery thereof and extending from side to side is attached to leg 92 with passage 29e aligned with a corresponding slot in leg 92. Passage 31e extending through body 26e along its full length has a diameter relatively larger than the width of passage 29e. During normal road speed and low ambient temperature conditions thermostatic element 88 and block 94 are in the dashed line position shown in FIG. 14; however, when the temperature of thermostatic element 88 is elevated due to the increase in refrigerant pressure in the condenser, the thermostatic element 88 and block 94 move to the solid line position shown with passage 29e in alignment with passage 31e at inlet port 30 to thereby further restrict the flow of refrigerant and consequently lower the pressure of the refrigerant downstream of the control device. Block 94 is preferably selected so that it has sufficient longitudinal length so that passage 29e exceeds the turbulent flow pattern of the liquid passing through the passage. However, if desired, leg 92 could also be used without block 94 and could have various shaped configurations at its lower end such as apertures or slots or even a rectangular bottom edge adapted to block a portion of orifice 31e when thermostatic element 88 is in its lower most position as seen in FIG. 14.

As used in an air conditioning system all of the above described embodiments are mounted in a conduit as shown in FIG. 2. In addition to the structure shown a filter is normally attached to both the inlet and outlet end in a conventional manner.

In view of the above, it will be seen that the several objects of the invention are achieved and other advantageous results obtained. In carrying out the invention a reliable, simple and easily assembled device provides additional restriction to the flow of refrigerant under conditions of high condenser pressure by means of a temperature responsive thermostatic metal element. Increasing the pressure of the refrigerant concomitantly increases its temperature which is sensed by the thermostatic metal element which moves to effectively increase the restriction to flow. Use of temperature changes as the sensed parameter for providing a change in flow restriction provides for more stable operation compared to prior art reliance on pressure which has more transitory fluctuations.

As various changes could be made in the above construction without departing from the scope of the invention, it is intended that all matter included in the above description or shown in the accompanied drawings be interpreted as illustrative and not in a limiting sense.

What is claimed:

1. A regulating valve for use in an air conditioning system comprising a body member having a longitudinal axis, an outer periphery and a selected length receivable in a conduit of the air conditioning system, seal means comprising an annular seal seat formed about the outer periphery of the body member and an elastomeric member received on the seat to provide a seal between the body member and the conduit, the seal means having an inlet side and an outlet side, a passageway in the body member having an inlet port on the inlet side of the seal means and an outlet port on the outlet side of the seal means, an auxiliary passageway in said body having an inlet port on the inlet side of the seal means and an outlet port on the outlet side of the seal means, and a temperature responsive multilayer thermostatic metal element having two opposite ends, one end of the multilayer thermostatic metal element fixedly mounted to the body member and the other end of the thermostatic metal element movable to variably change the restriction to flow of fluid through the auxiliary passageway in dependence upon the temperature of the thermostatic metal element.

2. A regulating valve according to claim 1 in which the passageway extends along the entire length of the body member and includes a first passage having a first selected cross sectional area in communication with the inlet port and extending along the longitudinal axis to a second passage having a second, larger cross sectional area which extends to the outlet port, an auxiliary inlet port extends through a wall of the body member on the inlet side of the seal means into the second passage and the movable other end of the thermostatic metal element is movable to restrict flow through the auxiliary inlet port.

3. A regulating valve according to claim 1 in which the thermostatic metal element is in the form of a helix.

4. A regulating valve according to claim 1 in which the thermostatic metal element is in the form of a generally straight strip.

5. A regulating valve according to claim 1 in which the passageway extends along the entire length of the body member and includes a first passage having a first selected cross sectional area in communication with the inlet port and extending along the longitudinal axis to a second passage having a second, larger cross sectional area which extends to the outlet port, said auxiliary inlet port extending through a wall of the body member on the inlet side of the seal means into the second passage and a sleeve having a generally cylindrical wall and having an aperture formed through the cylindrical wall being rotatably disposed on the body member between a position in which the aperture is in alignment with the auxiliary inlet port and position out of alignment with the auxiliary inlet port and the thermostatic metal element is helical in configuration with the other, movable end fixed to the sleeve.

6. A regulating valve for use in an air conditioning system comprising an elongated body member having first and second opposite ends and an outer periphery, the valve receivable in a conduit, seal means mounted on the body member intermediate the first and second ends to provide a seal between the valve and the conduit, the seal means comprising an annular seal seat formed about the outer periphery of the body member and an elastomeric member received on the seal seat, a passage extending through the body member between an inlet port on one side of the seal means and an outlet port on the other side of the seal means, an auxiliary passageway in said body having an inlet port on the inlet side of the seal means and an outlet port on the outlet side of the seal means, and a temperature responsive multilayer thermostatic metal element having two opposite ends, one end fixedly mounted on the elongated member on the inlet side of the seal means and the other end movable to variably open and close at least a portion of the inlet port of said auxiliary massage in dependence upon the temperature of the thermostatic metal element.

7. A regulating valve according to claim 6 in which the thermostatic metal element is in the form of a helix.

8. A regulating valve according to claim 6 in which the thermostatic metal element is in the form of a generally straight strip.

9. A regulating valve according to claim 1 in which the body is formed with a radially extending hub having an outer periphery and the seal seat is formed in the outer periphery of the hub, said hub containing said passageway and said auxiliary passageway spaced from one another extending longitudinally through the hub and a flag is disposed on the movable other end of the thermostatic element and is movable into and out of alignment with one of the passageway and said auxiliary passageway.

10. A regulating valve according to claim 1 in which a sealing element is disposed on the movable other end of the thermostatic element and is movable into and out of engagement with the inlet port of the auxiliary passageway.

11. A regulating valve according to claim 10 in which the inlet port is circular and the sealing element is spherical.

12. A regulating valve according to claim 1 in which the passageway and said auxiliary passageway extend along the entire length of the body member and an end cap having a generally cylindrical wall portion is rotatably mounted at the inlet end of the body member, the end cap having an end wall with a first aperture formed therethrough movable into a position in alignment with the auxiliary passageway and another position out of alignment with the auxiliary passageway as the end cap is rotated between first and second positions and an accurate slot formed therethrough in alignment with the passageway throughout the rotation of the end cap between the first and second positions, and the thermostatic metal element is helical in configuration with the movable other end fixed to the end cap.

13. A regulating valve according to claim 1 in which the passageway has a bore having a selected cross sectional area and extends along the entire length of the body member, the passageway has a longitudinal axis coincident with the longitudinal axis of the body member, and an end cap having a generally cylindrical wall portion being rotatably mounted on the body member about the longitudinal axis of the body member at the inlet end of the body member, the end cap having a cylindrical wall and an end wall with a bore extending through the end wall having a smaller cross sectional area than the bore of the passageway, the center of the bore in the end wall lying on the longitudinal axis of the passageway, and the auxiliary inlet port is formed through a wall of the body member on the inlet side of the seal means in communication with the passageway, an aperture being formed in the cylindrical wall of the end cap and being movable between a position in alignment with the auxiliary inlet port and another position out ok alignment with the auxiliary inlet port as the end cap is rotated and the thermostatic metal element is helical in configuration with the other, movable and fixed to the cylindrical wall of the end cap.

14. A regulating valve according to claim 1 in which the passageway and the auxiliary passageway extend along the entire length of the body member and each includes a passage spaced from one another and extending from the inlet port of the body member, each of the passages being spaced from one another and having a selected cross sectional area, further the passages merging together at a point intermediate the inlet and outlet ports and continuing on to the outlet port, the cross sectional area of the merged passages having a cross sectional area approximately as great as the combined cross sectional area of each of the spaced passages and a sleeve member rotatably mounted on the body member adjacent to inlet port, the sleeve having an end wall portion movable between a position in alignment with one of the first and second spaced passages at the inlet port and out of alignment with the one of the first and second passages at the inlet port and the thermostatic metal element is helical in configuration and the other, movable end is fixedly attached to the sleeve member.

15. A regulating valve according to claim 1 in which the passageway and the auxiliary passageway extend along the entire length of the body member and each includes a passage spaced from one another and extending from the inlet port of the body member, each of the pass&gas having a selected cross sectional area, the passages merging together at a point intermediate the inlet and outlet ports and continuing on to the outlet port, the cross sectional area of the merged passages having a cross sectional area at least as great as the combined cross sectional area of the spaced passageway and auxiliary passageway.

* * * * *